(12) United States Patent
Mise et al.

(10) Patent No.: US 6,897,897 B2
(45) Date of Patent: May 24, 2005

(54) HORIZONTAL CONTOUR SIGNAL GENERATION CIRCUIT IN SINGLE CHIP COLOR CAMERA

(75) Inventors: Tetsuo Mise, Hirakata (JP); Yukio Mori, Hirakata (JP); Seiji Okada, Hirakata (JP); Ryuichiro Tominaga, Daito (JP); Masahiro Seto, Suita (JP)

(73) Assignee: Sanyo Electric Co., Ltd., Osaka (JP)

( * ) Notice: Subject to any disclaimer, the term of this patent is extended or adjusted under 35 U.S.C. 154(b) by 724 days.

(21) Appl. No.: 09/946,169

(22) Filed: Sep. 5, 2001

(65) Prior Publication Data

US 2002/0047908 A1 Apr. 25, 2002

(30) Foreign Application Priority Data

Sep. 8, 2000 (JP) ........................................ 2000-273687
Mar. 22, 2001 (JP) ........................................ 2001-083407

(51) Int. Cl.$^7$ ............................................. H04N 5/208
(52) U.S. Cl. ...................... 348/252; 348/234; 348/625; 348/222.1
(58) Field of Search ................................ 348/252, 235, 348/663, 262, 263, 256, 631, 630, 625, 624, 234, 222.1, 236; 382/162, 166

(56) References Cited

U.S. PATENT DOCUMENTS

| 5,285,267 A | * | 2/1994 | Lim ............................. 348/663 |
| 5,430,499 A | * | 7/1995 | Asada et al. ................. 348/628 |
| 6,018,373 A |   | 1/2000 | Hanai |
| 6,148,116 A | * | 11/2000 | Park et al. ................... 382/266 |
| 6,456,325 B1 | * | 9/2002 | Hayashi ....................... 348/234 |
| 6,774,937 B1 | * | 8/2004 | Kobayashi ................... 348/222.1 |
| 2004/0080631 A1 | * | 4/2004 | Tominaga et al. .......... 348/234 |

FOREIGN PATENT DOCUMENTS

EP          1 011 265 A1      6/2000

OTHER PUBLICATIONS

Abstract Only, European 10071812, K. Hayaski, "Image Singal Processor", Dec. 22, 1998.
Abstract Only, European 01210144, S. Imakake, "High Frequency Emphasis Circuit For Luminance Singal", Aug. 16, 1989.

* cited by examiner

Primary Examiner—Aung Moe
(74) Attorney, Agent, or Firm—Arent Fox (57) ABSTRACT

A horizontal contour signal generation circuit in a single chip color camera comprises a first horizontal contour signal generation circuit provided in a stage succeeding a first horizontal low-pass filter, a second horizontal contour signal generation circuit provided in a stage succeeding a second horizontal low-pass filter, and a selection circuit for adaptively selecting and outputting the first horizontal contour signal generated by the first horizontal contour signal generation circuit and the second horizontal contour signal generated by the second horizontal contour signal generation circuit on the basis of chroma information for each predetermined area calculated on the basis of a color difference signal, the first horizontal low-pass filter having the property of passing a higher frequency component, as compared with the second low-pass filter.

8 Claims, 10 Drawing Sheets

| 1 | 1 | 1 |
|---|---|---|
| 1 | 1 | 1 |
| 1 | 1 | 1 |

HORIZONTAL CONTOUR SIGNAL GENERATION CIRCUIT IN SINGLE CHIP COLOR CAMERA

BACKGROUND OF THE INVENTION

1. Field of the Invention

The present invention relates to a horizontal contour signal generation circuit in a single chip color camera.

2. Description of the Prior Art

Figure 12:
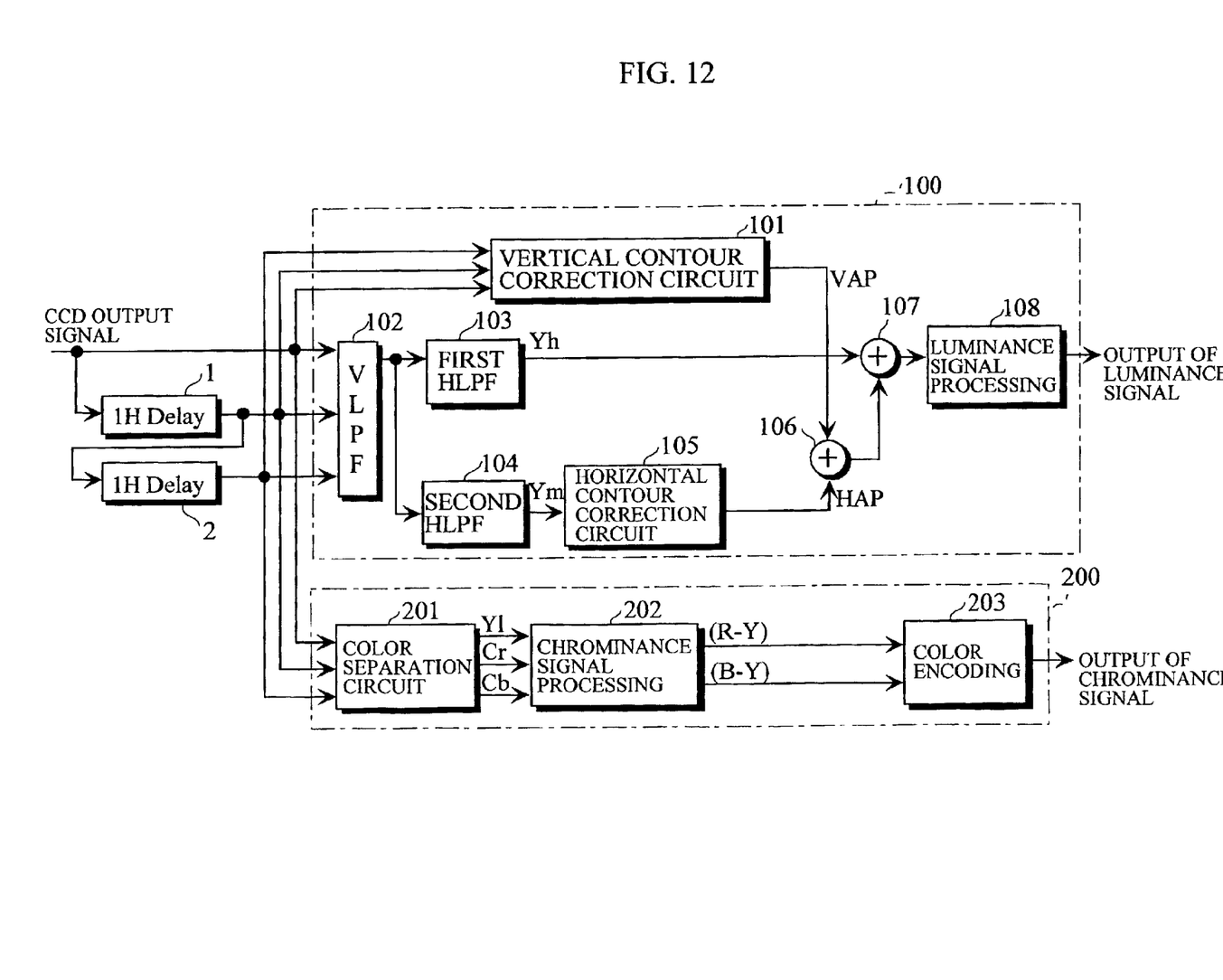
FIG. 12 illustrates the configuration of a conventional signal processing circuit in a single chip CCD color camera.

FIG. 12 illustrates the configuration of a conventional signal processing circuit in a single chip CCD (Charge Coupled Device) color camera.

The signal processing circuit comprises two delay circuits 1 and 2, a Y-series (luminance signal series) processing circuit 100, and a C-series (chrominance signal series) processing circuit 200.

The first 1H delay circuit 1 generates a video signal obtained by delaying an input video signal (a CCD output signal) by 1H (one horizontal period). The second 1H delay circuit 2 generates a video signal obtained by further delaying by 1H the video signal which has been delayed by 1H.

The input video signal, the video signal which has been delayed by 1H, and the video signal which has been delayed by 2H are fed to the Y-series processing circuit 100 and are also fed to the C-series processing circuit 200.

The operation of the Y-series processing circuit 100 will be first described.

The input video signal, the video signal which has been delayed by 1H, and the video signal which has been delayed by 2H are fed to a vertical contour correction circuit 101 and are fed to a VLPF (Vertical Low-Pass Filter) 102. The vertical contour correction circuit 101 generates a vertical contour signal (vertical aperture signal) VAP on the basis of the input video signal, the video signal which has been delayed by 1H, and the signal which has been delayed by 2H. The VLPF 102 subjects the input video signal, the video signal which has been delayed by 1H, and the video signal which has been delayed by 2H to vertical low-pass filtering processing.

A signal outputted from the VLPF 102 is fed to a first HLPF (Horizontal Low-Pass Filter) 103, and is fed to a second HLPF 104. Each of the LPFs 103 and 104 subjects a signal outputted from the VLPF 102 to horizontal low-pass filtering processing. The first HLPF 103 is constituted by an LPF composed of a large number of taps, and the second HLPF 104 is constituted by an LPF composed of a small number of taps. The first HLPF 103 has the property of passing a higher frequency component, as compared with the second HLPF 104.

An output Ym of the second HLPF 104 is fed to a horizontal contour correction circuit 105. The horizontal contour correction circuit 105 generates a horizontal contour signal (horizontal aperture signal) HAP on the basis of the output Ym of the second HLPF 104.

The vertical contour signal VAP generated by the vertical contour correction circuit 101 and the horizontal contour signal HAP generated by the horizontal contour correction circuit 105 are added by a first adder 106. An output of the first adder 106 and an output Yh of the first HLPF 103 are added by a second adder 107.

An output of the second adder 107 is fed to a luminance signal processing circuit 108, and is outputted as a luminance signal after a synchronizing signal and a blanking signal are added thereto.

It is preferable that the horizontal contour signal HAP is generated on the basis of a signal whose high frequency component has been removed. Accordingly, the horizontal contour signal HAP is generated on the basis of the output Ym of the second HLPF 104 having the property of not passing a higher frequency component, as compared with the first HLPF 103.

On the other hand, it is preferable that used as a luminance signal to be added to a contour signal which is the sum of the vertical contour signal VAP and the horizontal contour signal HAP is a luminance signal including a high frequency component. Accordingly, the luminance signal Yh outputted from the first HLPF 103 having the property of passing a higher frequency component, as compared with the second HLPF 104, is used.

Description is now made of the operation of the C-series processing circuit 200.

The input video signal, the video signal which has been delayed by 1H, and the video signal which has been delayed by 2H are fed to a color separation circuit 201, where a luminance signal Y1 and chrominance signals Cr and Cb are generated. The luminance signal Y1 and the chrominance signals Cr and Cb which are obtained by the color separation circuit 201 are fed to a chrominance signal processing circuit 202.

The chrominance signal processing circuit 202 includes an RBG matrix circuit, a color difference matrix circuit, and so on, to generate color difference signals (R–Y) and (B–Y). The color difference signals (R–Y) and (B–Y) obtained by the chrominance signal processing circuit 202 are fed to a color encoding circuit 203.

In the color encoding circuit 203, two color carriers between which there is a phase difference of 90° are respectively balance-modulated by the color difference signals (R–Y) and (B–Y) and are synthesized, to generate a chrominance signal.

In the conventional Y-series processing circuit 100, the resolution is lowered in an achromatic portion.

SUMMARY OF THE INVENTION

The present invention is an improvement of the above-mentioned prior art, and has its object to provide a horizontal contour signal generation circuit in a single chip CCD color camera capable of obtaining a high-resolution luminance signal in either an achromatic portion or a chromatic portion.

A first horizontal contour signal generation circuit in a single chip color camera according to the present invention is characterized by comprising a first horizontal contour signal generation circuit provided in a stage succeeding a first horizontal low-pass filter; a second horizontal contour signal generation circuit provided in a stage succeeding a second horizontal low-pass filter; and a selection circuit for adaptively selecting and outputting the first horizontal contour signal generated by the first horizontal contour signal generation circuit and the second horizontal contour signal generated by the second horizontal contour signal generation circuit on the basis of chroma information for each predetermined area calculated on the basis of a color difference signal, the first horizontal low-pass filter having the property of passing a higher frequency component, as compared with the second low-pass filter.

A second horizontal contour signal generation circuit in a single chip color camera according to the present invention is characterized by comprising a first horizontal contour signal generation circuit provided in a stage succeeding a first horizontal low-pass filter; a second horizontal contour signal generation circuit provided in a stage succeeding a second horizontal low-pass filter; and weighting and addition means for weighting the first horizontal contour signal generated by the first horizontal contour signal generation circuit and the second horizontal contour signal generated by the second horizontal contour signal generation circuit and adding the weighted signals on the basis of chroma information for each predetermined area calculated on the basis of a color difference signal, the first horizontal low-pass filter having the property of passing a higher frequency component, as compared with the second low-pass filter.

An example of the weighting and addition means is one comprising means for dividing one screen into a plurality of areas and finding a chroma integrated value for each of the areas obtained by the division on the basis of the color difference signal, means for finding, on the basis of the chroma integrated value for each of the areas, a weighting factor of the first horizontal contour signal and the second horizontal contour signal for the area, means for finding a weighting factor for each pixel on the basis of the weighting factor found for each of the areas; and means for weighting the first horizontal contour signal and the second horizontal contour signal and adding the weighted signals on the basis of the weighting factor for each pixel.

An example of the weighting and addition means is one comprising means for finding chroma for each pixel on the basis of the color difference signal, means for dividing one screen into a plurality of areas, counting the number of pixels for which the chroma is not less than a threshold value for each of the areas obtained by the division, and taking the counted number as a chroma evaluated value in the area, and means for integrating for each of the areas the chroma evaluated values for the area corresponding to a plurality of fields, means for subjecting the integrated chroma evaluated values for each of the areas to two-dimensional filtering processing, to find the final chroma evaluated value for the area, means for finding a chroma evaluated value for each pixel on the basis of the final chroma evaluated value for each of the areas, and means for weighting the first horizontal contour signal and the second horizontal contour signal and adding the weighted signals on the basis of the chroma evaluated value for each pixel.

A third horizontal contour signal generation circuit in a single chip color camera according to the present invention is characterized by comprising a first horizontal low-pass filter; a second horizontal low-pass filter; a selection circuit for adaptively selecting and outputting an output signal of the first horizontal low-pass filter and an output signal of the second horizontal low-pass filter on the basis of chroma information for each predetermined area calculated on the basis of a color difference signal; and a horizontal contour correction circuit for generating a horizontal contour signal on the basis of an output signal of the selection circuit, the first horizontal low-pass filter having the property of passing a higher frequency component, as compared with the second horizontal low-pass filter.

A fourth horizontal contour signal generation circuit in a single chip color camera is characterized by comprising a first horizontal low-pass filter; a second horizontal low-pass filter; weighting and addition means for weighting an output signal of the first horizontal low-pass filter and an output signal of the second horizontal low-pass filter and adding the weighted output signals on the basis of chroma information for each predetermined area calculated on the basis of a color difference signal; and a horizontal contour correction circuit for generating a horizontal contour signal on the basis of an output signal of the weighting and addition means, the first horizontal low-pass filter having the property of passing a higher frequency component, as compared with the second horizontal low-pass filter.

An example of the weighting and addition means is one comprising means for dividing one screen into a plurality of areas and finding a chroma integrated value for each of the areas obtained by the division on the basis of the color difference signal, means for finding, on the basis of the chroma integrated value for each of the areas, a weighting factor of the output signal of the first horizontal low-pass filter and the output signal of the second horizontal low-pass filter for the area, means for finding a weighting factor for each pixel on the basis of the weighting factor found for each of the areas, and means for weighting the output signal of the first horizontal low-pass filter and the output signal of the second horizontal low-pass filter and adding the weighted output signals on the basis of the weighting factor for each pixel.

An example of the weighting and addition means is one comprising means for finding chroma for each pixel on the basis of the color difference signal, means for dividing one screen into a plurality of areas, counting the number of pixels for which the chroma is not less than a threshold value for each of the areas obtained by the division, and taking the counted number as a chroma evaluated value in the area, means for integrating for each of the areas the chroma evaluated values for the area corresponding to a plurality of fields, means for subjecting the integrated chroma evaluated values for each of the areas to two-dimensional filtering, to find the final chroma evaluated value for the area, means for finding a chroma evaluated value for each pixel on the basis of the final chroma evaluated value for each of the areas, and means for weighting the output signal of the first horizontal low-pass filter and the output signal of the second horizontal low-pass filter and adding the weighted output signals on the basis of the chroma evaluated value for each pixel.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description is now made of an embodiment of the present invention.

[A] Description of First Embodiment

[1] Description of Signal Processing Circuit in Single Chip CCD Color Camera

Figure 1:
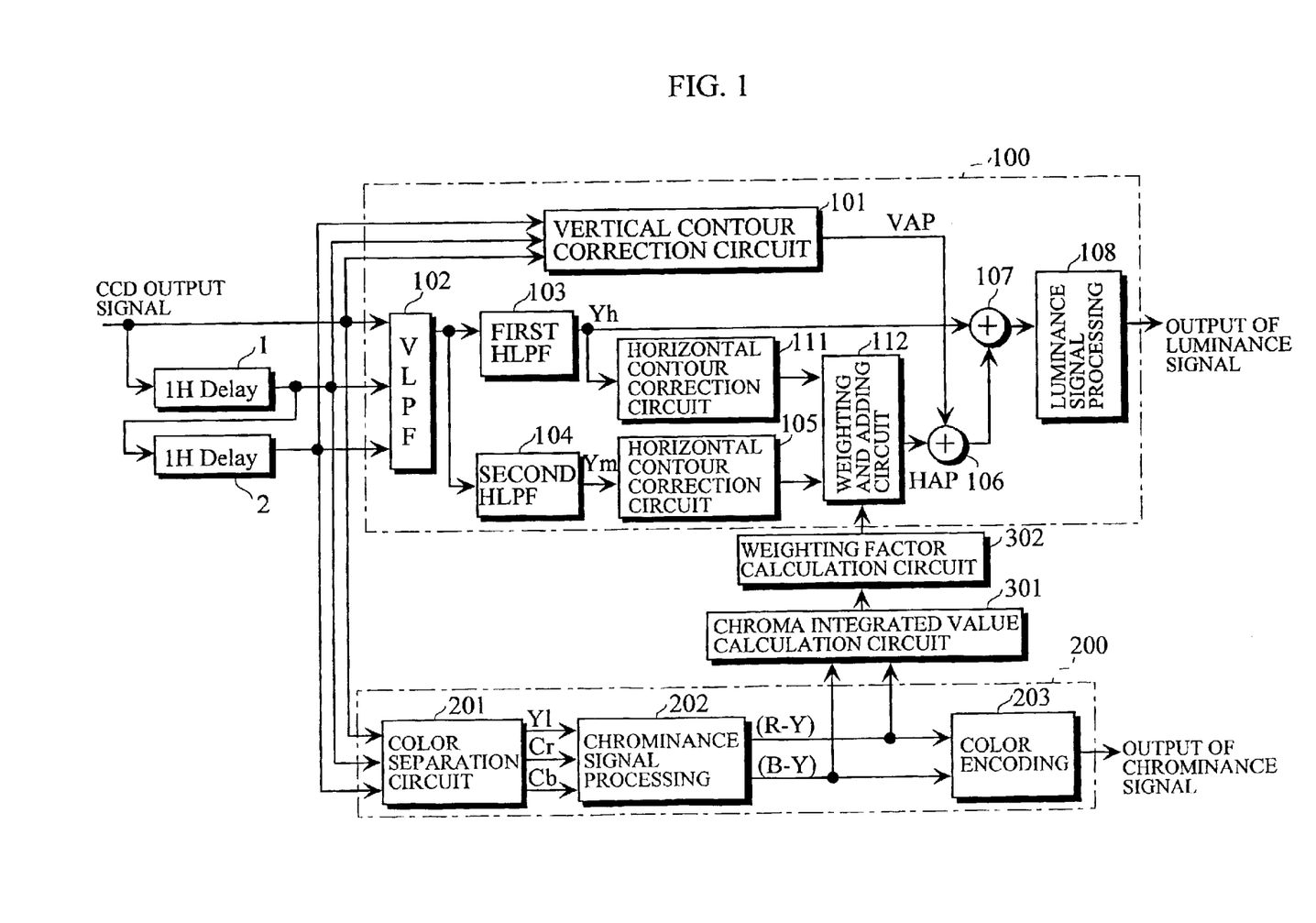
FIG. 1 is a block diagram showing the configuration of a first embodiment of a signal processing circuit in a single chip CCD color camera.

FIG. 1 illustrates the configuration of a first embodiment of a signal processing circuit in a single chip CCD color camera. In FIG. 1, the same reference numerals as those shown in FIG. 12 are assigned the same reference numerals and hence, the description thereof is not repeated.

A signal processing circuit shown in FIG. 1 differs from the signal processing circuit shown in FIG. 12 in the following points:

(1) An output Yh of a first HLPF 103 is fed to a horizontal contour correction circuit 111 newly provided in addition to a second adder 107. The horizontal contour correction circuit 111 to which the output Yh of the first HLPF 103 is inputted is referred to as a first horizontal contour correction circuit 111, and a horizontal contour correction circuit 105 to which an output Ym of a second HLPF 104 is inputted is referred to as a second horizontal contour correction circuit 105.

(2) A first horizontal contour signal generated by the first horizontal contour correction circuit 111 and a second horizontal contour signal generated by the second horizontal contour correction circuit 105 are fed to a weighting and addition circuit 112 newly provided. Further, an output of the weighting and addition circuit 112 is fed to a first adder 106.

(3) There is provided a chroma integrated value calculation circuit 301 for calculating a chroma integrated value for each of a plurality of chroma integration areas set in one screen on the basis of color difference signals (R−Y) and (B−Y) outputted from a chrominance signal processing circuit 202.

(4) There is provided a weighting factor calculation circuit 302 for calculating a weighting factor for each pixel on the basis of the chroma integrated value for each of the chroma integration areas calculated by the chroma integrated value calculation circuit 301.

(5) The weighting and addition circuit 112 weights the first horizontal contour signal and the second horizontal contour signal and adds the weighted signals on the basis of the weighting factor for each pixel calculated by the weighting factor calculation circuit 302. Letting HAP1 be a first horizontal contour signal, HAP2 be a second horizontal contour signal, and K be a weighting factor, the weighting and addition circuit 112 executes an operation of (1−K)·HAP1+K·HAP2, where K is a value within a range of 0≦K≦1.

[2] Description of Characteristics of First HLPF 103 and Second HLPF 104

The first HLPF 103 is constituted by an LPF composed of a large number of taps, and the second HLPF 104 is constituted by an LPF composed of a small number of taps.

Figure 2:
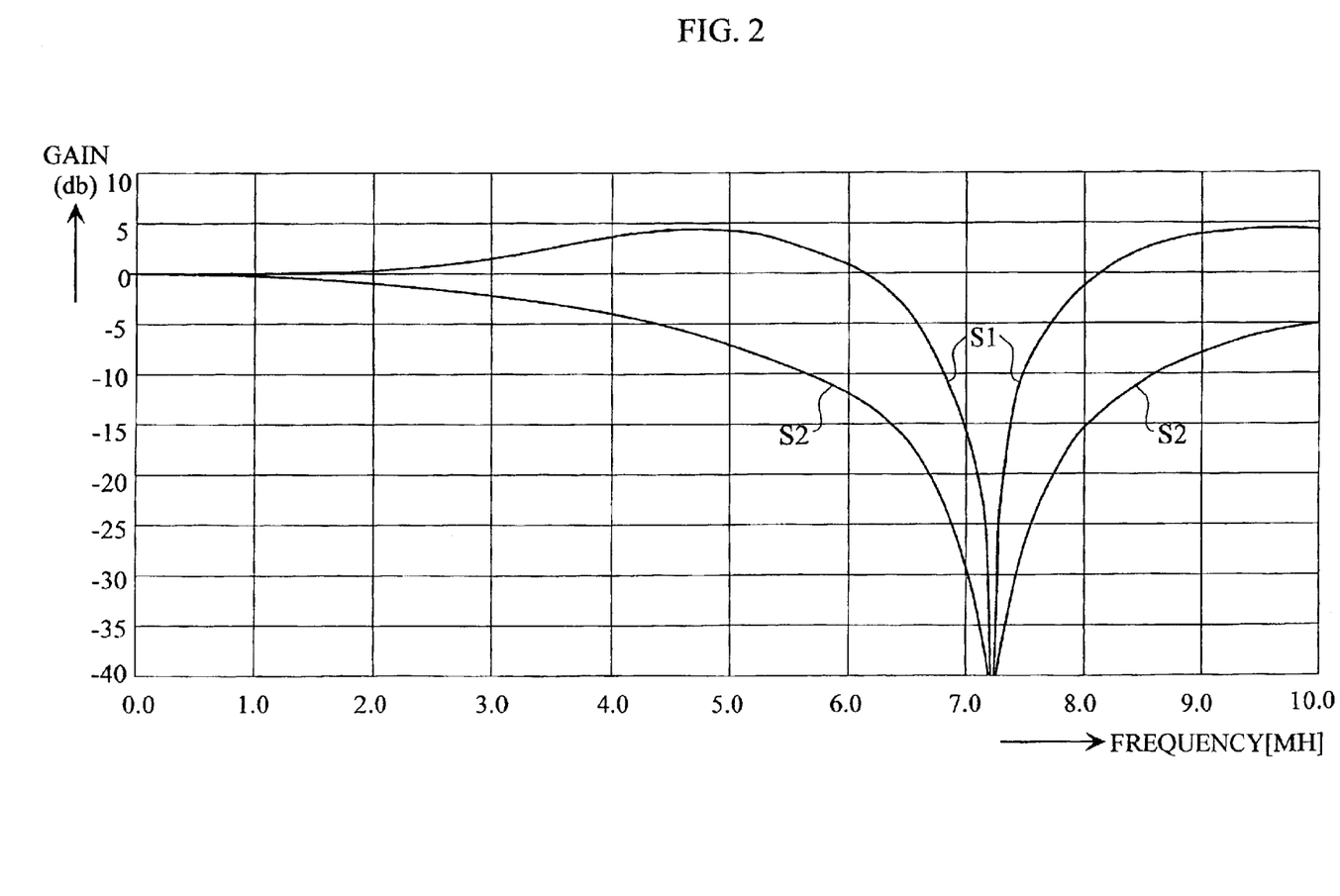
FIG. 2 is a graph showing the filer characteristics of both HLPFs 103 and 104.

FIG. 2 illustrates the filter characteristics of both the HLPFs 103 and 104. In FIG. 2, a curve S1 and a curve S2 respectively indicate the filter A characteristics of the first HLPF 103 and the filter characteristics of the second HLPF 104. As apparent from FIG. 2, the first HLPF 103 has the property of passing a higher frequency component, as compared with the second HLPF 104.

[3] Description of Characteristics of First Horizontal Contour Correction Circuit 111 and Second Horizontal Contour Correction Circuit 105

As described above, the first HLPF 103 has the property of passing a higher frequency component, as compared with the second HLPF 104. Accordingly, the first horizontal contour correction circuit 111 can generate a finer (higher-resolution) horizontal contour signal, as compared with the second horizontal contour correction circuit 111.

However, the first HLPF 103 is constituted by an LPF composed of a large number of taps. When the horizontal contour signal generated by the first horizontal contour correction circuit 111 is used, therefore, ringing may occur at the boundary of colors in an image.

In the present embodiment, therefore, the first horizontal contour signal HAP1 generated on the basis of the output Yh of the first HLPF 103 passing a higher frequency component is employed for an achromatic portion including a high frequency component, and the second horizontal contour signal HAP2 which causes no ringing is employed for a chromatic portion including no high frequency component.

[4] Description of Chroma Integrated Value Calculation Circuit 301

Figure 3:
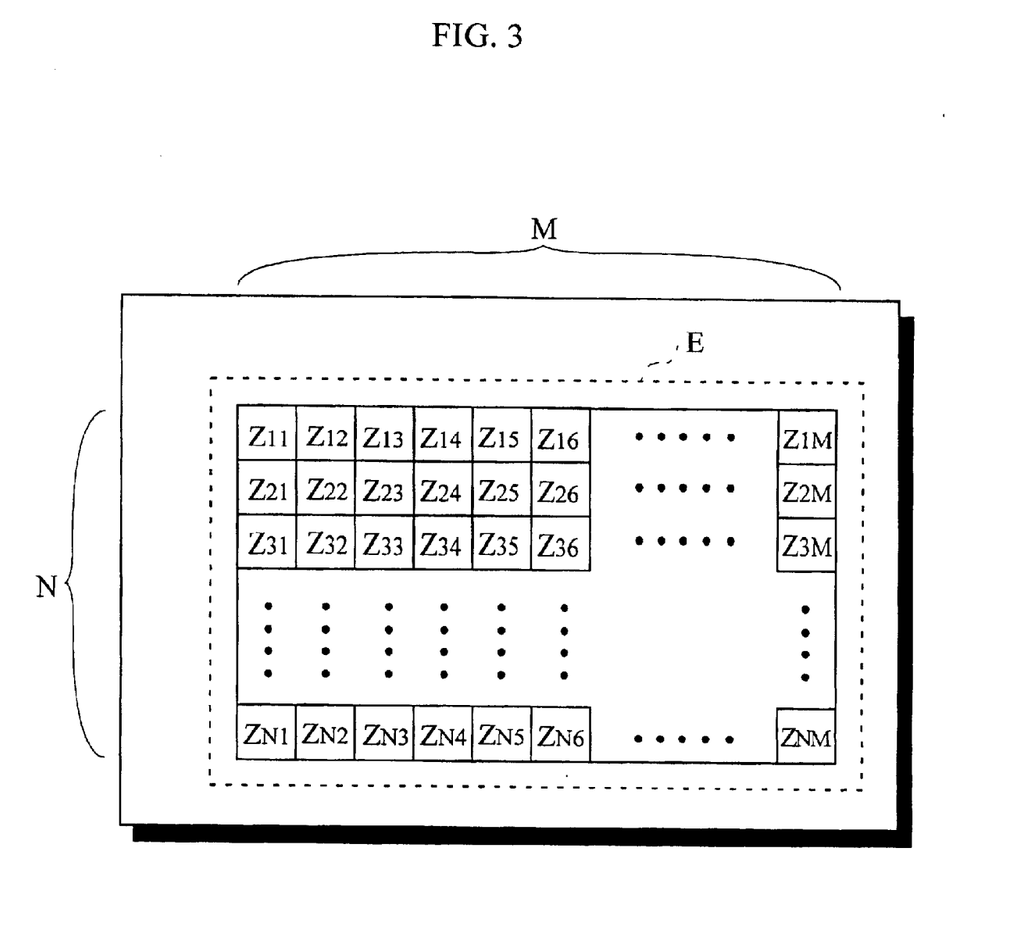
FIG. 3 is a schematic view showing a chroma integration area set in an effective image area E in a screen.

As shown in FIG. 3, M×N chroma integration areas $Z_{11}$ to $Z_{NM}$ are set in an effective image area E in one screen. The chroma integrated value calculation circuit 301 calculates a chroma integrated value for each of the chroma integration areas $Z_{11}$ to $Z_{NM}$. Chroma is found by $\{(R-Y)^2+(B-Y)^2\}^{1/2}$.

[5] Description of Weighting Factor Calculation Circuit 302

The weighting factor calculation circuit 302 first calculate, on the basis of the chroma integrated value for each of the chroma integration areas $Z_{11}$ to $Z_{NM}$ calculated by the chroma integrated value calculation circuit 301, a weighting factor (a weighting factor corresponding to the central position of the chroma integration area) K of the first horizontal contour signal HAP1 and the second horizontal contour signal HAP2 for the chroma integration area.

Figure 4:
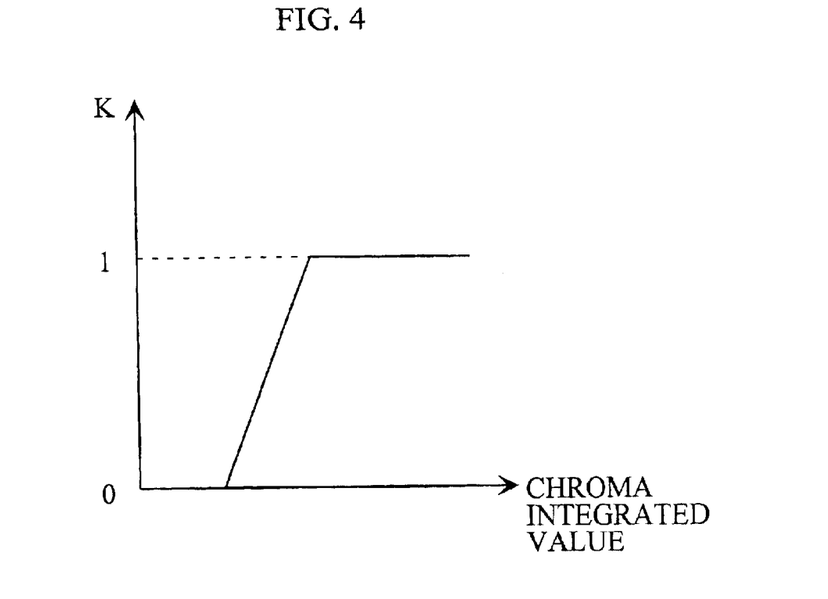
FIG. 4 is a graph showing the relationship between a chroma integrated value and a weighting factor K.

Specifically, the weighting factor K is determined such that the larger the chroma integrated value is, the higher the weighting and addition ratio of the second horizontal contour signal HAP2 is (the larger K is), while being determined such that the smaller the chroma integrated value is, the weighting and addition ratio of the first horizontal contour signal HAP1 is (the smaller K is), as shown in FIG. 4.

The weighting factor K for each pixel is then calculated on the basis of the weighting factor K for each of the chroma integration areas $Z_{11}$ to $Z_{NM}$.

Figure 5:
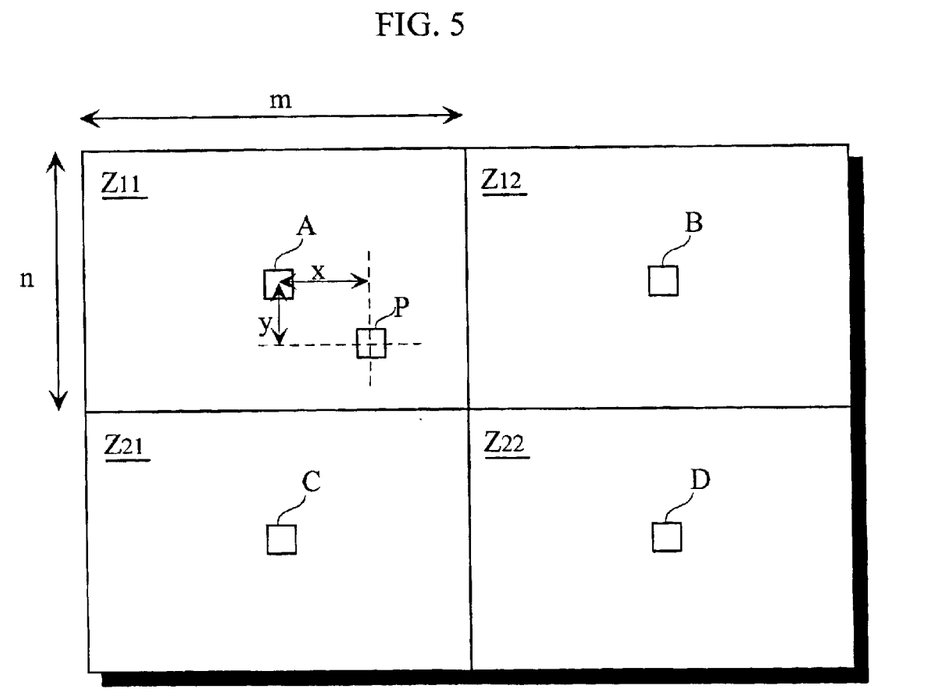
FIG. 5 is a schematic view for explaining a method of calculating a weighting factor K for each pixel by a weighting factor calculation circuit.

Description is made of a method of calculating the weighting factor K for each pixel using FIG. 5.

In FIG. 5, only four chroma integration areas $Z_{11}$, $Z_{12}$, $Z_{21}$, and $Z_{22}$ are illustrated for convenience of illustration. A factor K calculated with respect to the area $Z_{11}$ is taken as a factor for a pixel A at the center of the area $Z_{11}$, which shall be represented by Ka. Similarly, a factor K calculated with respect to the area $Z_{12}$ is taken as a factor for a pixel B at the center of the area $Z_{12}$, which shall be represented by Kb. Similarly, a factor K calculated with respect to the area $Z_{21}$ is taken as a factor for a pixel C at the center of the area $Z_{21}$, which shall be represented by Kc. Similarly, a factor K calculated with respect to the area $Z_{22}$ is taken as a factor for a pixel D at the center of the area $Z_{22}$, which shall be represented by Kd.

The factors for the pixels A, B, C, and D at the centers of the respective areas are respectively represented by Ka, Kb, Kc, and Kd. Description is made of a method of finding a factor for a pixel other than the pixels A, B, C, and D at the centers of the areas.

In the area $Z_{11}$, for example, a factor Kp for a pixel P at a position spaced x rightward apart from the pixel A and spaced y downward apart therefrom is found by linearly interpolating the factors (Ka, Kb, Kc, Kd) for the pixels at the centers of the four areas $Z_{11}$, $Z_{12}$, $Z_{21}$, and $Z_{22}$ around the pixel P. That is, the factor Kp for the pixel P is found by the following equation (1):

$$Kp = \frac{\left\{\frac{Ka \times (n-y) + Kc \times y}{n} \times (m-x)\right\} + \left\{\frac{Kb \times (n-y) + Kd \times y}{n} \times x\right\}}{m} \quad (1)$$

The weighting and addition circuit 112 executes an operation of $(1-K) \cdot HAP1 - K \cdot HAP2$ for each pixel on the basis of the weighting factor K found on the basis of a chroma integrated value calculated in the preceding field, to output a horizontal contour signal HAP.

Although in the present embodiment, the chroma integrated value calculation circuit 301 calculates the chroma integrated value for each of the chroma integration areas $Z_{11}$ to $Z_{NM}$, a chroma average value for each of the chroma integration areas $Z_{11}$ to $Z_{NM}$ may be calculated.

A selection circuit for calculating chroma for each of a plurality of areas obtained by dividing one screen or for each pixel, and adaptively selecting and outputting the first horizontal contour signal HAP1 generated by the first horizontal contour correction circuit 111 and the second horizontal contour signal HAP2 generated by the second horizontal contour correction circuit 105 may be provided in place of the weighting and addition circuit 112. In this case, the second horizontal contour signal HAP2 may be selected when the chroma is more than a predetermined value, while the first horizontal contour signal HAP1 may be selected when the chroma is not more than the predetermined value.

[6] Description of Modified Example

In FIG. 1, both the horizontal contour correction circuits 111 and 105 may be removed, to directly input the output Yh of the first HLPF 103 and the output Ym of the second HLPF 104 to the weighting and addition circuit 112 and provide one horizontal contour correction circuit between the weighting and addition circuit 112 and the adder 106.

Specifically, the output Yh of the first HLPF 103 and the output Ym of the second HLPF 104 are weighted and added by the weighting and addition circuit 112. In the case, the weighting factor K is determined such that the larger the chroma integrated value is, the higher the weighing and addition ratio of the output Ym of the second HLPF 104 is, while being determined such that the smaller the chroma integrated value is, the higher the weighting and addition ratio of the output Yh of the first HLPF 103 is. An output of the weighting and addition circuit 112 is subjected to horizontal contour correction by the horizontal contour correction circuit provided in a stage succeeding the weighting and addition circuit 112.

[B] Description of Second Embodiment

[1] Description of Signal Processing Circuit in Signal Chip CCD Color Camera

Figure 6:
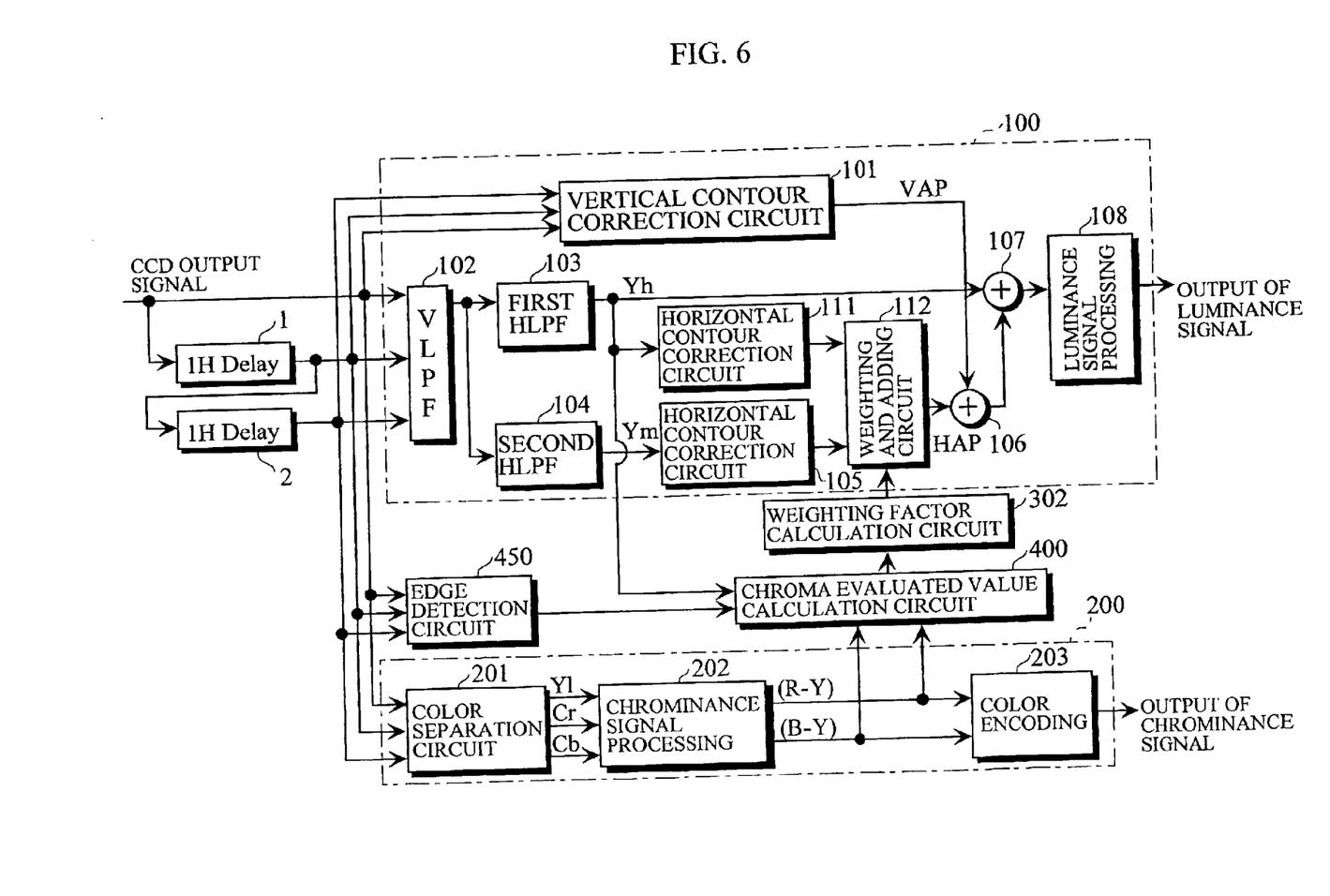
FIG. 6 is a block diagram showing the configuration of a second embodiment of a signal processing circuit in a single chip CCD color camera.

FIG. 6 illustrates the configuration of a second embodiment of a signal processing circuit in a single chip CCD color camera. In FIG. 6, the same units as those shown in FIG. 1 are assigned the same reference numerals and hence, the description thereof is not repeated.

The signal processing circuit shown in FIG. 6 differs from the signal processing circuit shown in FIG. 1 in the following points.

(1) An edge detection circuit 450 is provided.

In the edge detection circuit 450, an edge is detected on the basis of an input video signal, a video signal which is delayed by 1H, and a video signal which is delayed by 2H.

(2) A chroma evaluated value calculation circuit 400 is provided in place of the chroma integrated value calculation circuit 301 shown in FIG. 1.

An output Yh of a first HLPF 103 and an edge detection signal from the edge detection circuit 450 are inputted in addition to color difference signals (R−Y) and (B−Y) outputted from a chrominance signal processing circuit 202 to the chroma evaluated value calculation circuit 400.

(3) A weighting factor calculation circuit 302 calculates a weighting factor K for each pixel on the basis of a chroma evaluated value for each area found by the chroma evaluated value calculation circuit 400.

[2] Description of Chroma Evaluated Value Calculation Circuit 400

Figure 7:
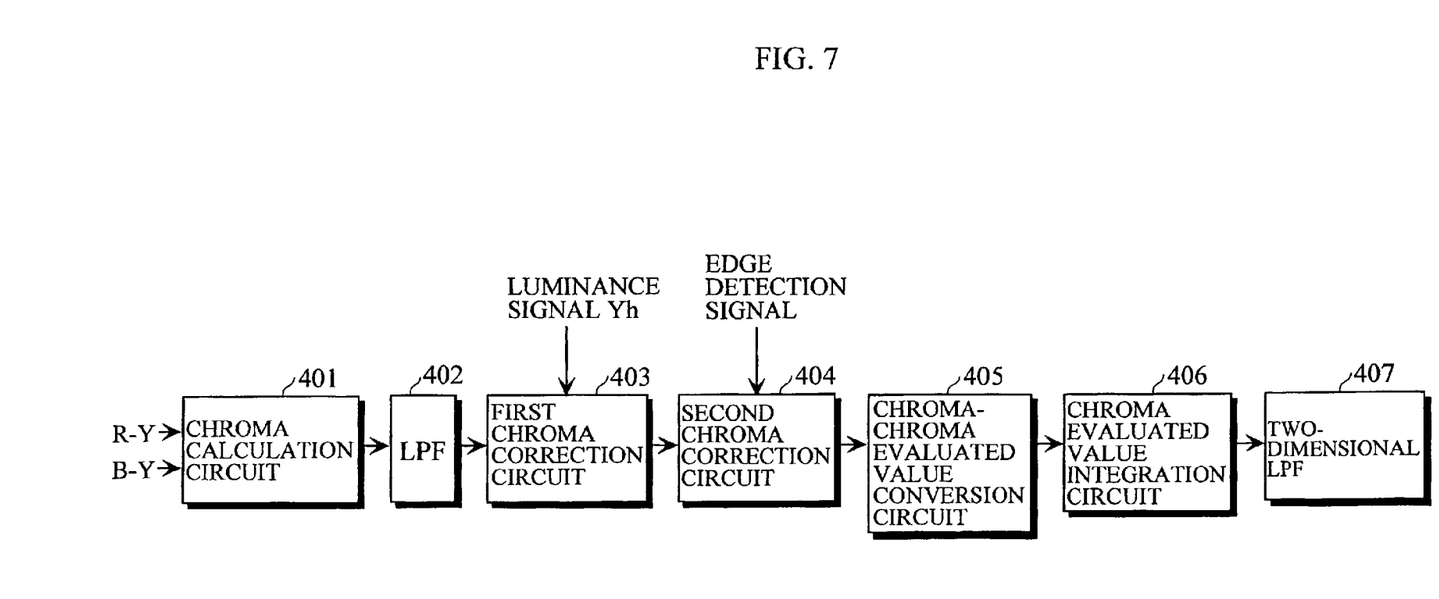
FIG. 7 is a block diagram showing the configuration of a chroma evaluated value calculation circuit.

FIG. 7 illustrates the configuration of the chroma evaluated value calculation circuit 400.

A chroma calculation circuit 401 calculates chroma for each pixel on the basis of the color difference signals (R−Y) and (B−Y) outputted from the chrominance signal processing circuit 202. Chroma is found by $\{(R-Y)^2+(B-Y)^2\}^{1/2}$.

A chroma signal for each pixel obtained by the chroma calculation circuit 401 is fed to an LPF (Low-Pass Filter) 402, where noise is removed therefrom. The chroma signal from which noise has been removed is fed to a first chroma correction circuit 403.

A luminance signal Yh outputted from the first HLPF 103 is inputted to the first chroma correction circuit 403. The first chroma correction circuit 403 corrects the chroma such that it is high in a low-luminance portion on the basis of the luminance signal Yh. The chroma signal which has been corrected by the first chroma correction circuit 403 is fed to a second chroma correction circuit 404.

The edge detection signal from the edge detection circuit 450 is inputted to the second chroma correction circuit 404. The second chroma correction circuit 404 corrects the chroma such that it reaches zero at an edge on the basis of the edge detection signal. The reason will be described.

Figure 8:
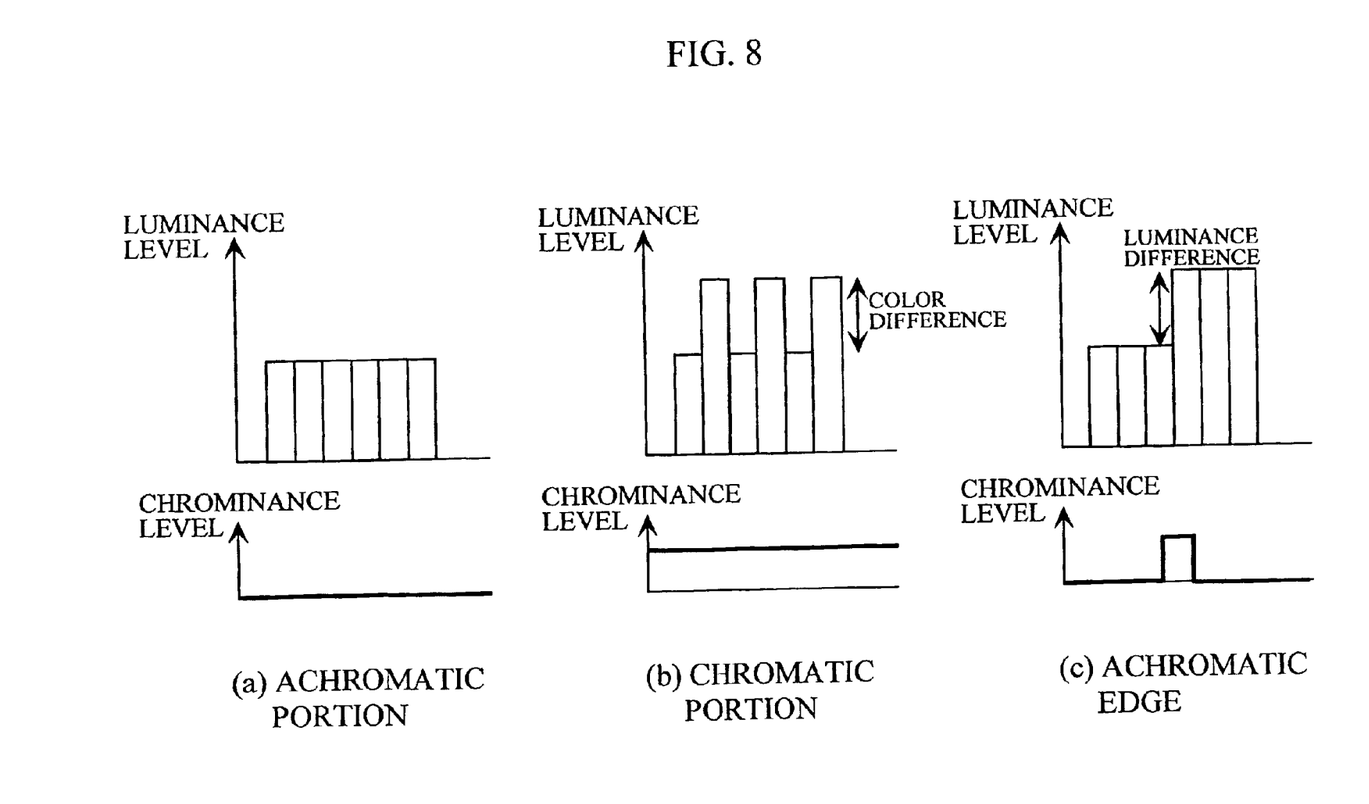
FIG. 8 is an illustration for explaining the reason why the chroma of an edge is corrected so as to reach zero by a second chroma correction circuit 404.

In an achromatic portion, the luminance level is flat, and the chrominance level reaches zero, as shown in FIG. 8(a). On the other hand, in a chromatic portion, the luminance level is alternately changed depending on the difference between color filters, while the chrominance level is constant, as shown in FIG. 8(b). At an achromatic edge, the difference in the luminance level appears on an image as a false color (a color which is not inherently desired to exist), as shown in FIG. 8(c). Therefore, the chroma at the edge reaches zero in order to prevent the false The chroma signal which has been corrected by the second chroma correction circuit 404 is fed to a chroma-chroma evaluated value conversion circuit 405.

The chroma-chroma evaluated value conversion circuit 405 divides an effective image area in one screen into a plurality of areas, counts the number of pixels for which chroma is not less than a threshold value for each of the areas obtained by the division, and takes the counted number as a chroma evaluated value in the area. The chroma evaluated value for each of the areas calculated by the chroma-chroma evaluated value conversion circuit 405 is fed to a chroma evaluated value integration circuit 406.

The chroma evaluated value integration circuit 406 integrates for each of the areas the chroma evaluated values for the area corresponding to three fields, and writes the integrated chroma evaluated values into a register in the area. The integrated chroma evaluated values for each of the areas obtained by the chroma evaluated value integration circuit 406 are fed to a two-dimensional LPF 407.

The two-dimensional LPF subjects the integrated chroma evaluated values for each of the areas obtained by the chroma evaluated value integration circuit 406 to two-dimensional LPF processing to obtain a final chroma evaluated value for the area.

The operations of the chroma-chroma evaluated value conversion circuit 405, the chroma evaluated value integration circuit 406, and the two-dimensional LPF 407 will be described more specifically using FIG. 9.

An effective image area in one screen shall be divided into 25 areas.

Figure 9:
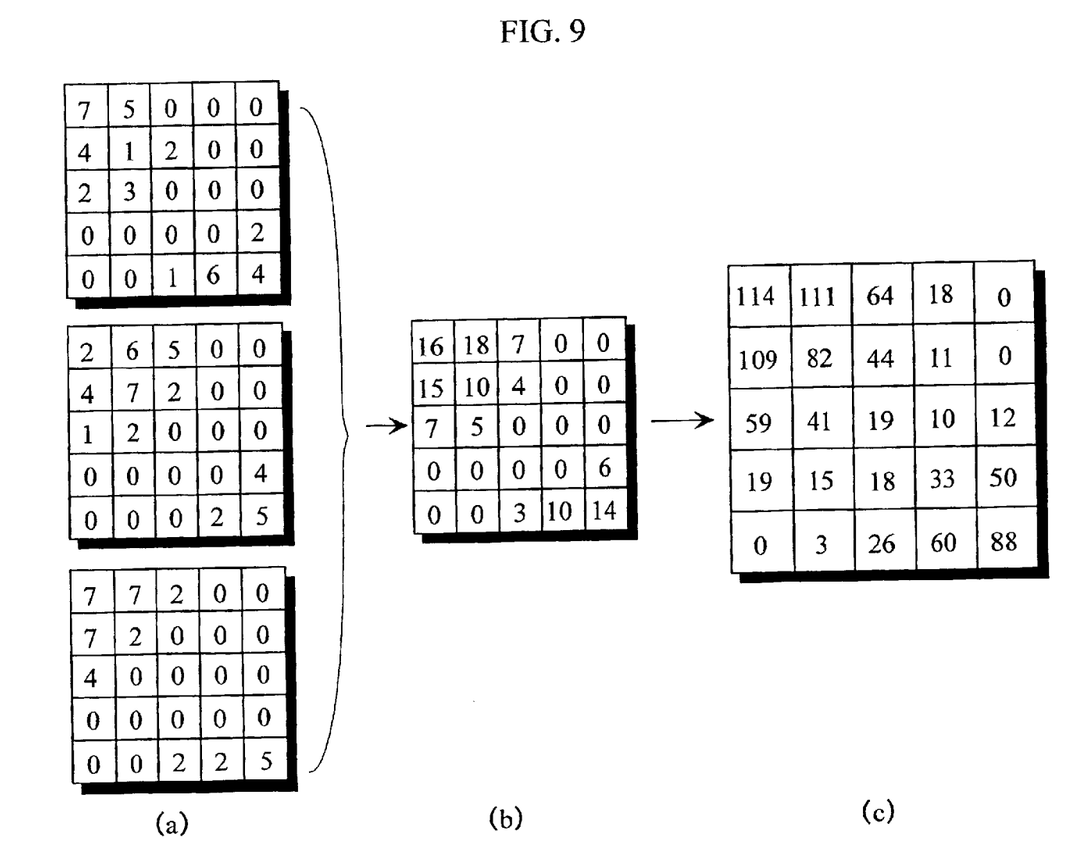
FIG. 9 is an illustration for specifically explaining the operations of a chroma-chroma evaluated value conversion circuit 405, a chroma evaluated value integration circuit 406, and a two-dimensional LPF 407.

FIG. 9(a) illustrates an example of chroma evaluated values for each of the areas corresponding to three fields calculated by the chroma-chroma evaluated value conversion circuit 405.

FIG. 9(b) illustrates an integrated chroma evaluated value for each of the areas calculated by the chroma evaluated value integration circuit 406 from the chroma evaluated values for the area corresponding to three fields shown in FIG. 9(a).

Figure 10:
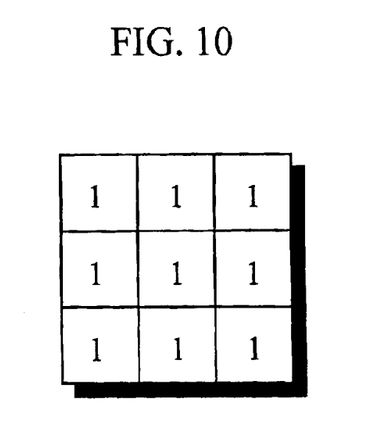
FIG. 10 is a schematic view showing an example of a two-dimensional LPF used in the two-dimensional LPF 407.

FIG. 9(c) illustrates results in a case where the two-dimensional LPF 407 subjects the integrated chroma evaluated value shown in FIG. 9(b) to two-dimensional LPF processing using a two-dimensional LPF shown in FIG. 10. The two-dimensional LPF shown in FIG. 10 is one example of the two-dimensional LPF. Other two-dimensional LPFs may be used.

[3] Description of Weighting Factor Calculation Circuit 302

The weighting factor calculation circuit 302 first calculates, on the basis of the final chroma evaluated value for each area calculated by the chroma evaluated value calculation circuit 400, a weighting factor (weighting factor corresponding to the central position of the area) K of a first horizontal contour signal HAP1 and a second horizontal contour signal HAP2 for the area.

Figure 11:
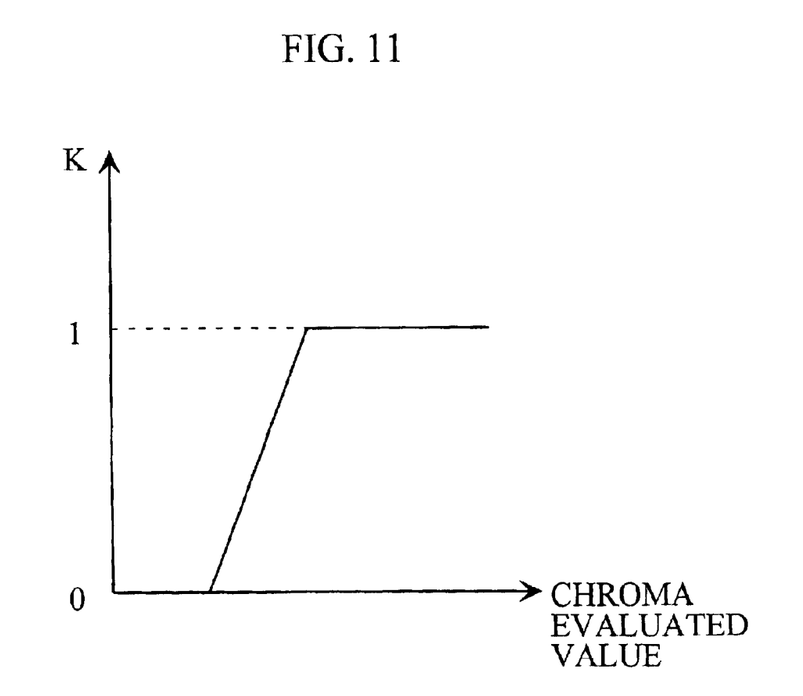
FIG. 11 is a graph showing the relationship between a chroma evaluated value and a weighting factor K.

Specifically, as shown in FIG. 11, the weighting factor K is determined such that the larger the chroma evaluated value is, the higher the weighting and addition ratio of the second horizontal contour signal HAP2 is (the larger K is), while being determined such that the smaller the chroma integrated value is, the larger the weighting and addition ratio of the first horizontal contour signal HAP1 is (the smaller K is).

In the first embodiment, the weighting factor K for each pixel is calculated on the basis of the weighting factor K for each area in the same method as that described using FIG. 5.

A weighting and addition circuit 112 executes an operation of (1−K)·HAP1+K·HAP2 for each pixel on the basis of the weighting factor K found on the basis of a chroma evaluated value calculated in the preceding field, to output a horizontal contour signal HAP.

[4] Description of Modified Example

In FIG. 6, both the horizontal contour correction circuits 111 and 105 may be removed, to directly input the output Yh of the first HLPF 103 and the output Ym of the second HLPF 104 to the weighting and addition circuit 112 and provide one horizontal contour correction circuit between the weighting and addition circuit 112 and the adder 106.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A horizontal contour signal generation circuit in a single chip color camera, comprising:

a first horizontal contour signal generation circuit provided in a stage succeeding a first horizontal low-pass filter;

a second horizontal contour signal generation circuit provided in a stage succeeding a second horizontal low-pass filter; and a selection circuit for adaptively selecting and outputting the first horizontal contour signal generated by the first horizontal contour signal generation circuit and the second horizontal contour signal generated by the second horizontal contour signal generation circuit on the basis of chroma information for each predetermined area calculated on the basis of a color difference signal, the first horizontal low-pass filter having the property of passing a higher frequency component, as compared with the second low-pass filter.

2. A horizontal contour signal generation circuit in a single chip color camera, comprising:

a first horizontal contour signal generation circuit provided in a stage succeeding a first horizontal low-pass filter;

a second horizontal contour signal generation circuit provided in a stage succeeding a second horizontal low-pass filter; and weighting and addition means for weighting the first horizontal contour signal generated by the first horizontal contour signal generation circuit and the second horizontal contour signal generated by the second horizontal contour signal generation circuit and adding the weighted signals on the basis of chroma information for each predetermined area calculated on the basis of a color difference signal, the first horizontal low-pass filter having the property of passing a higher frequency component, as compared with the second low-pass filter.

3. The horizontal contour signal generation circuit in the single chip color camera according to claim 2, wherein the weighting and addition means comprises means for dividing one screen into a plurality of areas and finding a chroma integrated value for each of the areas obtained by the division on the basis of the color difference signal, means for finding, on the basis of the chroma integrated value for each of the areas, a weighting factor of the first horizontal contour signal and the second horizontal contour signal for the area, means for finding a weighting factor for each pixel on the basis of the weighting factor found for each of the areas; and means for weighting the first horizontal contour signal and the second horizontal contour signal and adding the weighted signals on the basis of the weighting factor for each pixel.

4. The horizontal contour signal generation circuit in the single chip color camera according to claim 2, wherein the weighting and addition means comprises means for finding chroma for each pixel on the basis of the color difference signal, means for dividing one screen into a plurality of areas, counting the number of pixels for which the chroma is not less than a threshold value for each of the areas, and taking the counted number as a chroma evaluated value in the area, and means for integrating for each of the areas the chroma evaluated values for the area corresponding to a plurality of fields, means for subjecting the integrated chroma evaluated values for each of the areas to two-dimensional filtering processing, to find the final chroma evaluated value for the area, means for finding a chroma evaluated value for each pixel on the basis of the final chroma evaluated value for each of the areas, and means for weighting the first horizontal contour signal and the second horizontal contour signal and adding the weighted signals on the basis of the chroma evaluated value for each pixel.

5. A horizontal contour signal generation circuit in a single chip color camera, comprising:

a first horizontal low-pass filter;

a second horizontal low-pass filter;

a selection circuit for adaptively selecting and outputting an output signal of the first horizontal low-pass filter and an output signal of the second horizontal low-pass filter on the basis of chroma information for each predetermined area calculated on the basis of a color difference signal; and a horizontal contour correction circuit for generating a horizontal contour signal on the basis of an output signal of the selection circuit.

the first horizontal low-pass filter having the property of passing a higher frequency component, as compared with the second horizontal low-pass filter.

6. A horizontal contour signal generation circuit in a single chip color camera, comprising:

a first horizontal low-pass filter;

a second horizontal low-pass filter;

weighting and addition means for weighting an output signal of the first horizontal low-pass filter and an output signal of the second horizontal low-pass filter and adding the weighted output signals on the basis of chroma information for each predetermined area calculated on the basis of a color difference signal; and a horizontal contour correction circuit for generating a horizontal contour signal on the basis of an output signal of the weighting and addition means, the first horizontal low-pass filter having the property of passing a higher frequency component, as compared with the second horizontal low-pass filter.

7. The horizontal contour signal generation circuit in the single chip color camera according to claim 6, wherein the weighting and addition means comprises means for dividing one screen into a plurality of areas and finding a chroma integrated value for each of the areas obtained by the division on the basis of the color difference signal, means for finding, on the basis of the chroma integrated value for each of the areas, a weighting factor of the output signal of the first horizontal low-pass filter and the output signal of the second horizontal low-pass filter for the area, means for finding a weighting factor for each pixel on the basis of the weighting factor found for each of the areas, and means for weighting the output signal of the first horizontal low-pass filter and the output signal of the second horizontal low-pass filter and adding the weighted output signals on the basis of the weighting factor for each pixel.

8. The horizontal contour signal generation circuit in the single chip color camera according to claim 6, wherein the weighting and addition means comprises means for finding chroma for each pixel on the basis of the color difference signal, means for dividing one screen into a plurality of areas, counting the number of pixels for which the chroma is not less than a threshold value for each of the areas obtained by the division, and taking the counted number as a chroma evaluated value in the area, means for integrating for each of the areas the chroma evaluated values for the area corresponding to a plurality of fields;

means for subjecting the integrated chroma evaluated values for each of the areas to two-dimensional filtering, to find the final chroma evaluated value for the area, means for finding a chroma evaluated value for each pixel on the basis of the final chroma evaluated value for each of the areas, and means for weighting the output signal of the first horizontal low-pass filter and the output signal of the second horizontal low-pass filter and adding the weighted output signals on the basis of the chroma evaluated value for each pixel.

* * * * *